(12) United States Patent
Akiyama et al.

(10) Patent No.: US 8,429,499 B2
(45) Date of Patent: Apr. 23, 2013

(54) DISK DRIVE AND METHOD FOR DATA CONVERSION PROCESS IN A DISK DRIVE

(75) Inventors: Kei Akiyama, Kanagawa (JP); Yasuhiro Takase, Kanagawa (JP); Noritoshi Shinto, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 346 days.

(21) Appl. No.: 12/962,545

(22) Filed: Dec. 7, 2010

(65) Prior Publication Data

US 2011/0145680 A1 Jun. 16, 2011

(30) Foreign Application Priority Data

Dec. 10, 2009 (JP) .................................. 2009-280408

(51) Int. Cl.
*G11C 29/00* (2006.01)
(52) U.S. Cl.
USPC ......................................................... 714/769
(58) Field of Classification Search ................... 714/769
See application file for complete search history.

(56) References Cited

U.S. PATENT DOCUMENTS

| 7,003,046 B2 | 2/2006 | Hayami et al. | |
| 7,818,587 B2 * | 10/2010 | Drew et al. | 713/193 |
| 2004/0230819 A1 * | 11/2004 | Takahashi | 713/193 |
| 2007/0101160 A1 | 5/2007 | Yoshida et al. | |
| 2010/0239088 A1 * | 9/2010 | Torbarac | 380/201 |

FOREIGN PATENT DOCUMENTS

| JP | 2002-216429 | 8/2002 |
| JP | 2007-122843 | 5/2007 |
| JP | 2008-192291 | 8/2008 |

* cited by examiner

*Primary Examiner* — Michael Maskulinski

(57) ABSTRACT

A disk drive for encrypting user data. A motor configured to rotate a disk which stores encoded user data and an encryption flag which has not been encoded. An encoder/decoder processor configured to encode the user data that is written into the disk without encoding the encryption flag, and decodes the user data that is read out from the disk without decoding the encryption flag that is read out from the disk. An encryption processor configured to encrypt the user data at the encryption flag, wherein the encryption flag indicates encryption before the encoder/decoder processor starts encoding, and wherein the encryption processor obtains an encryption flag read out from the disk before the encoder/decoder processor completes decoding of the user data read out from the disk, commencing decryption of decoded data where the encryption flag indicates encryption before decoding of the user data is complete.

18 Claims, 7 Drawing Sheets

DISK DRIVE AND METHOD FOR DATA CONVERSION PROCESS IN A DISK DRIVE

CROSS-REFERENCE TO RELATED APPLICATION

This application claims priority from the Japanese Patent Application No. 2009-280408, filed Dec. 10, 2009, the disclosure of which is incorporated herein in its entirety by reference.

TECHNICAL FIELD

Embodiments of the present technology relate to a disk drive and a method for a data conversion process in a disk drive, and relates in particular to data conversion process for a disk drive which encrypts user data stored in a disk.

BACKGROUND

Devices which use disks in a variety of formats such as optical disks, opto-magnetic disks, or flexible magnetic disks are well known, but of these the hard disk drive (HDD) is widely used in electronic equipment such as video recording and playback devices and satellite navigation systems, in addition to computer systems.

The HDD stores user data in the magnetic disk upon receiving a write command from the host. In practical terms, the HDD stores the user data received from the host in an address on the magnetic disk specified by the write command. Moreover, the HDD reads out data from the magnetic disk at the address specified by a read command from the host, and transfers this to the host.

To protect user data stored in the disk from unauthorized access, many technologies are known that encrypts this user data in the disk drive.

The technology for encrypting user data is also used in some HDDs. The HDD encrypts user data received from the host, and stores this encrypted user data in the magnetic disk. Then in the read process, the HDD reads out the encrypted user data, decrypts it, and transfers it to the host.

SUMMARY

A disk drive for encrypting user data. A motor configured to rotate a disk which stores encoded user data and an encryption flag which has not been encoded. An encoder/decoder processor configured to encode the user data that is written into the disk without encoding the encryption flag, and decodes the user data that is read out from the disk without decoding the encryption flag that is read out from the disk. An encryption processor configured to encrypt the user data at the encryption flag, wherein the encryption flag indicates encryption before the encoder/decoder processor starts encoding, and wherein the encryption processor obtains an encryption flag read out from the disk before the encoder/decoder processor completes decoding of the user data read out from the disk, commencing decryption of decoded data where the encryption flag indicates encryption before decoding of the user data is complete.

DESCRIPTION OF THE DRAWINGS

The accompanying drawings, which are incorporated in and form a part of this specification, illustrate embodiments of the present technology and, together with the description, serve to explain the embodiments of the present technology.

Figure 1:
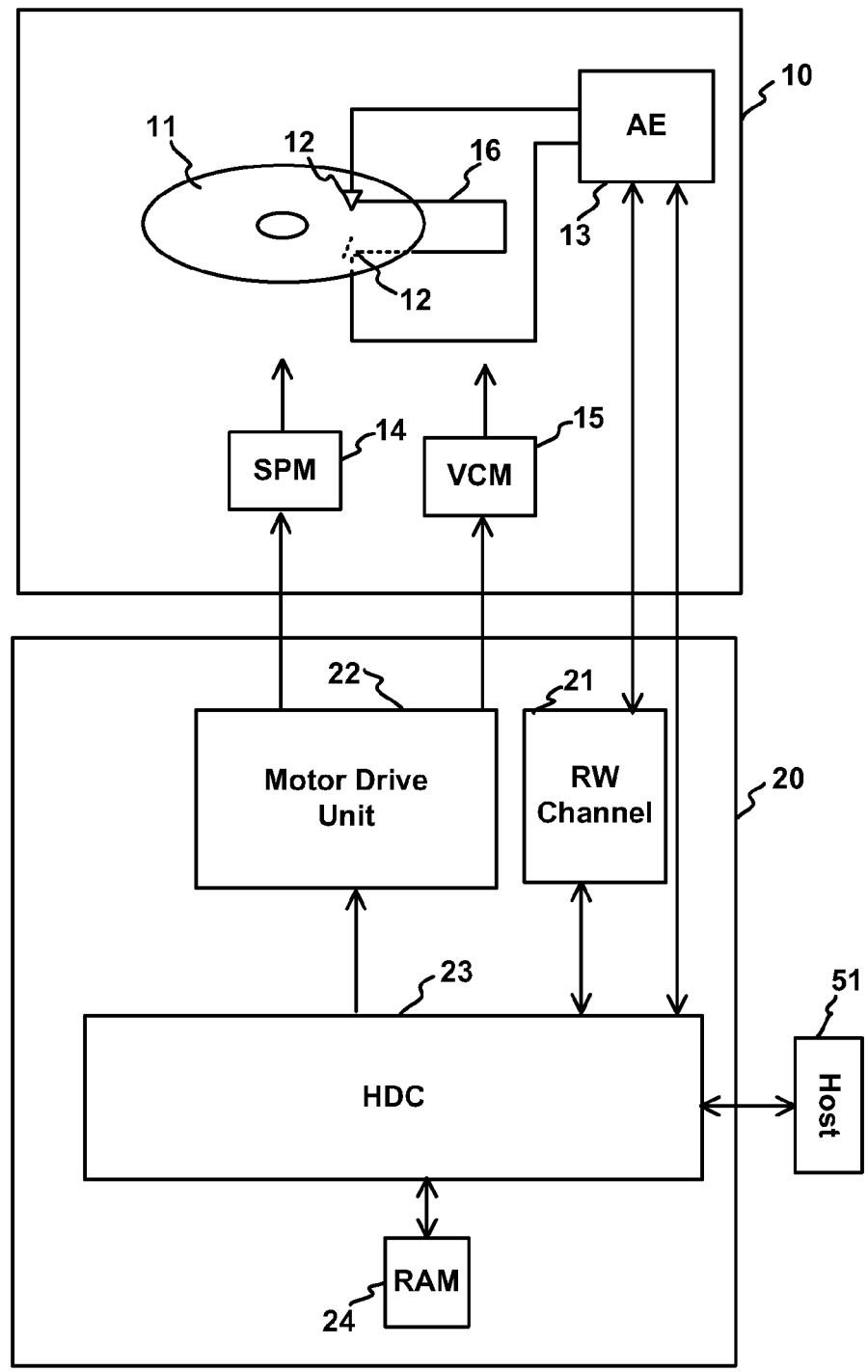
FIG. 1 is a lock diagram schematically illustrating the overall structure of the HDD in accordance with an embodiment of the present technology.

The drawings referred to in this description should not be understood as being drawn to scale except if specifically noted.

DESCRIPTION OF EMBODIMENTS

Reference will now be made in detail to the alternative embodiments of the present technology. While the technology will be described in conjunction with the alternative embodiments, it will be understood that they are not intended to limit the technology to these embodiments. On the contrary, the technology is intended to cover alternatives, modifications and equivalents, which may be included within the spirit and scope of the technology as defined by the appended claims.

Furthermore, in the following description of embodiments of the present technology, numerous specific details are set forth in order to provide a thorough understanding of the present technology. However, it should be noted that embodiments of the present technology may be practiced without these specific details. In other instances, well known methods, procedures, and components have not been described in detail as not to unnecessarily obscure embodiments of the present technology. Throughout the drawings, like components are denoted by like reference numerals, and repetitive descriptions are omitted for clarity of explanation if not necessary.

DESCRIPTION OF EMBODIMENTS OF THE PRESENT TECHNOLOGY FOR DISK DRIVE AND METHOD FOR DATA CONVERSION PROCESS IN A DISK DRIVE

Description will now be given of embodiments to which the invention can be applied. For convenience' sake, omissions and simplifications have been made in the following description and drawings to clarify the explanation. Furthermore, in the drawings, the same elements are keyed with the same symbols, and repeated descriptions have been omitted where necessary for the sake of clarity. In the embodiment, a hard disk drive (HDD) will be used as an example of a disk drive. It should be appreciated that other disk drives may be employed to practice the present technology.

In accordance with embodiments of the present technology, there is a constant demand for improvements in performance for HDDs, as well as for increases in storage capacity. In HDDs which encrypt user data (encrypting and decrypting) it is common to minimize as far as possible delay in the transfer of data which accompanies the encryption process. In the write process, the HDD informs the host without delay of the completion of writing using the write cache function, which enables a delay in processing for the host to be avoided. At the same time, it is necessary to send to the host the user data designated by the host in the read process.

In the read process for the encrypted data, the HDD must decrypt the user data read out from the magnetic disk, and compile plain text data from the decrypted user data. In order to improve performance, in one embodiment, it is desirable that the HDD be able to shorten the processing time (read data conversion processing time) taken from the reading out of user data from the magnetic disk to the start of transferring user data to the host.

Moreover, HDDs which encrypt only a selected portion of the user data must determine whether the user data read out from the magnetic disk is encrypted, decrypt encrypted user data, and skip the decryption process for user data that is not encrypted. Therefore, in one embodiment, HDDs that selectively encrypt user data in this way should lessen the delay in converting the read data that accompanies the determination of encrypted data.

An embodiment of the present technology is a disk drive that encrypts user data. This disk drive is provided with a motor which rotates a disk which stores encoded user data and an encryption flag which has not been encoded, an encoder/decoder processor, and an encryption processor. The encoder/decoder processor encodes the user data written into the disk without encoding the encryption flag written into the disk, and decodes the user data read out from the disk without decoding the encryption flag read out from the disk. The encryption processor encrypts user data whose encryption flag indicates encryption before the encoder/decoder processor starts encoding, and obtains the encryption flag read out from the disk before the encoder/decoder processor completes the decoding of the user data read out from the disk, commencing decryption of the decoded data where the encryption flag indicates encryption before decoding of the user data is complete. With this structure, it is possible to reduce the delay in the read process for encrypted user data.

In one embodiment, the disk drive is further provided with an error checking code generator which generates and attaches an error checking code to the user data before encryption of the user data by the encryption processor. By this means it is possible to protect the encrypted user data.

In one embodiment, the encoder/decoder processor in the disk drive carries out RLL encoding on the user data, and is further provided with an insertion processor which inserts an encryption flag into the RLL-encoded user data so as to satisfy RLL encoding rules. By this means it is possible to more accurately store and reproduce data.

In one embodiment, the disk drive is further provided with an error checking code generator which generates and attaches an error checking code to the user data before encryption of the user data by the encryption processor, the insertion processor combining the encryption flag and at least a part of the error checking code into a single block, which is inserted within the RLL-encoded user data. By this means it is possible to effectively generate blocks of a specified size.

In one embodiment, the insertion processor divides data containing the encryption flag and the error checking code into a plurality of blocks of identical data length, which are inserted separately within the RLL-encoded user data. By this means it is possible to effectively generate blocks of a specified size with a simple process without an undue influence on the RLL encoding rules.

In one embodiment, the encoder/decoder processor skips RLL encoding of part of the user data, the insertion processor dividing data containing the encryption flag and the error checking code into a plurality of blocks of identical data length, which are inserted separately within the RLL-encoded user data. By this means it is possible to effectively generate blocks of a specified size with a simple process without an undue influence on the RLL encoding rules.

In one embodiment, the disk drive is further provided with an error correction processor which generates and attaches an ECC code for data containing the encryption flag and user data encoded by the encoder/decoder processor, the error correction processor functioning as the insertion processor, dividing the ECC codes into a plurality of blocks of identical data length, which are inserted separately within the RLL-encoded user data. By this means it is possible to insert data with a simple process without an undue influence on the RLL encoding rules.

In one embodiment, the error correction processor inserts the ECC code after the encryption flag has been inserted in the RLL-encoded user data. By this means, it is possible to simplify the process.

In one embodiment, the error correction processor preferably transfers the encryption flag to the encryption processor after error correction processing. By this means, it is possible to allow the encryption processor to appropriately determine the presence of encryption in the user data.

A further embodiment of the present technology is a method of processing data transformation in a disk drive. This method encrypts user data whose encryption flag indicates encryption. The encrypted user data is encoded without encoding the encryption flag. The encoded user data and the encryption flag that has not been encoded are stored in the disk. The user data read out from the disk is decoded. The encryption flag read out from the disk is obtained before decoding of the user data is complete, and decryption of the decoded data commences before the decoding of the user data is complete where the encryption flag indicates encryption. By this it means, it is possible to reduce delay in the read process for encrypted user data.

In one embodiment, the HDD encrypts user data, and stores this encrypted user data in the magnetic disk. The HDD encrypts designated user data and stores it in the magnetic disk, storing user data that has not been designated in the magnetic disk without encryption. In the read process, the HDD decrypts the encrypted user data and transfers it to the host, transferring user data that has not been encrypted to the host without decryption.

In one embodiment, an encryption flag is attached to the user data. The encryption flag indicates whether the corresponding user data is data that should be encrypted or data for which the encryption process should be skipped. Typically, the host sets the encryption flag (indicating the presence or absence of encryption). The HDD may also set the encryption flag. The HDD determines whether user data should be encrypted/decrypted by referring to its encryption flag. Where the encryption flag indicates encryption, the HDD encrypts the user data and writes it to the magnetic disk, and decrypts the user data read out from the magnetic disk.

In one embodiment, in the write process, the HDD encrypts user data whose encryption flag indicates encryption, and stores the user data in the magnetic disk after encoding the encrypted user data. In the read process, the HDD decodes the user data read out from the magnetic disk, and decrypts user data whose encryption flag indicates encoding. The HDD skips the encryption and decryption processes for data whose encryption flag indicates no encryption.

In one embodiment, the HDD stores the encryption flag in the magnetic disk together with the user data. The characteristic of this embodiment is that the HDD stores the encryption flag in the magnetic disk without encoding it. By this means, the HDD is able to know the content of the encryption flag before commencing the decoding process on user data in the read process. The HDD carries out decoding and decryption of the user data using a pipeline process.

In practical terms, the HDD starts decryption of the user data before completing the decoding of the user data. HDD decrypts part of the user data for which decoding is complete while decoding another part of the user data. In this way, decoding and decryption are carried out simultaneously, enabling the processing time for the read process to be shortened.

An overview of the structure of an example HDD will now be described. FIG. 1 is a block diagram schematically illustrating the overall structure of HDD 1. Circuits such as read/write channel (RW channel) 21, motor driver unit 22, hard disk controller (HDC) 23 which is an integrated circuit for the logic circuit and MPU, and RAM 24 are mounted on circuit board 20 fixed to the outside of enclosure 10.

Within enclosure 10, spindle motor (SPM) 14 rotates magnetic disk 11 at a specified angular rotation speed. Magnetic disk 11 is a disk which stores the data. Each head slider 12 is provided with a slider which floats on the magnetic disk and a head element which carries out conversion (reading and writing of data) between the magnetic signal and an electric signal and is fixed to the slider. Each head slider 12 is supported by actuator 16. Actuator 16 is linked to a voice coil motor (VCM) 15 which moves head slider 12 above magnetic disk 11 in its radial direction through rotation on a rotational axis.

Motor driver unit 22 drives SPM 14 and VCM 15 according to control data from HDC 23. Arm electronic circuit (AE: Arm Electronics) 13 selects head slider 12 which accesses (read or write) magnetic disk 11 from a plurality of head elements 12 according to control data from HDC 23, and amplifies the read/write signal.

RW channel 21 amplifies the read signal supplied from AE 13 during the read process to a fixed amplitude, thereafter carrying out A/D conversion, a waveform equalization process, Viterbi decryption, serial/parallel conversion, an error correction process and the like. The processed data is transferred from RW channel 21 to HDC 23. Moreover, RW channel 21 attaches error correction codes to the data transferred from HDC 23 in the write process, generating write signals through processes such as parallel/serial conversion, O/A conversion and the like, and outputting a write signal to AE 13.

HDC 23, which is a example of a controller, has a number of functions. The MPU carries out part of the functions of the operation according to the firmware loaded into RAM 24, with the hardware circuit executing the remaining functions. HDC 23 executes overall control of HDD 1 and the functions necessary for data processing such as read/write process control, command execution sequencing, head positioning control (servo control) used in the servo signals, interface control with host 51, defect management, error processing and the like.

Figure 2:
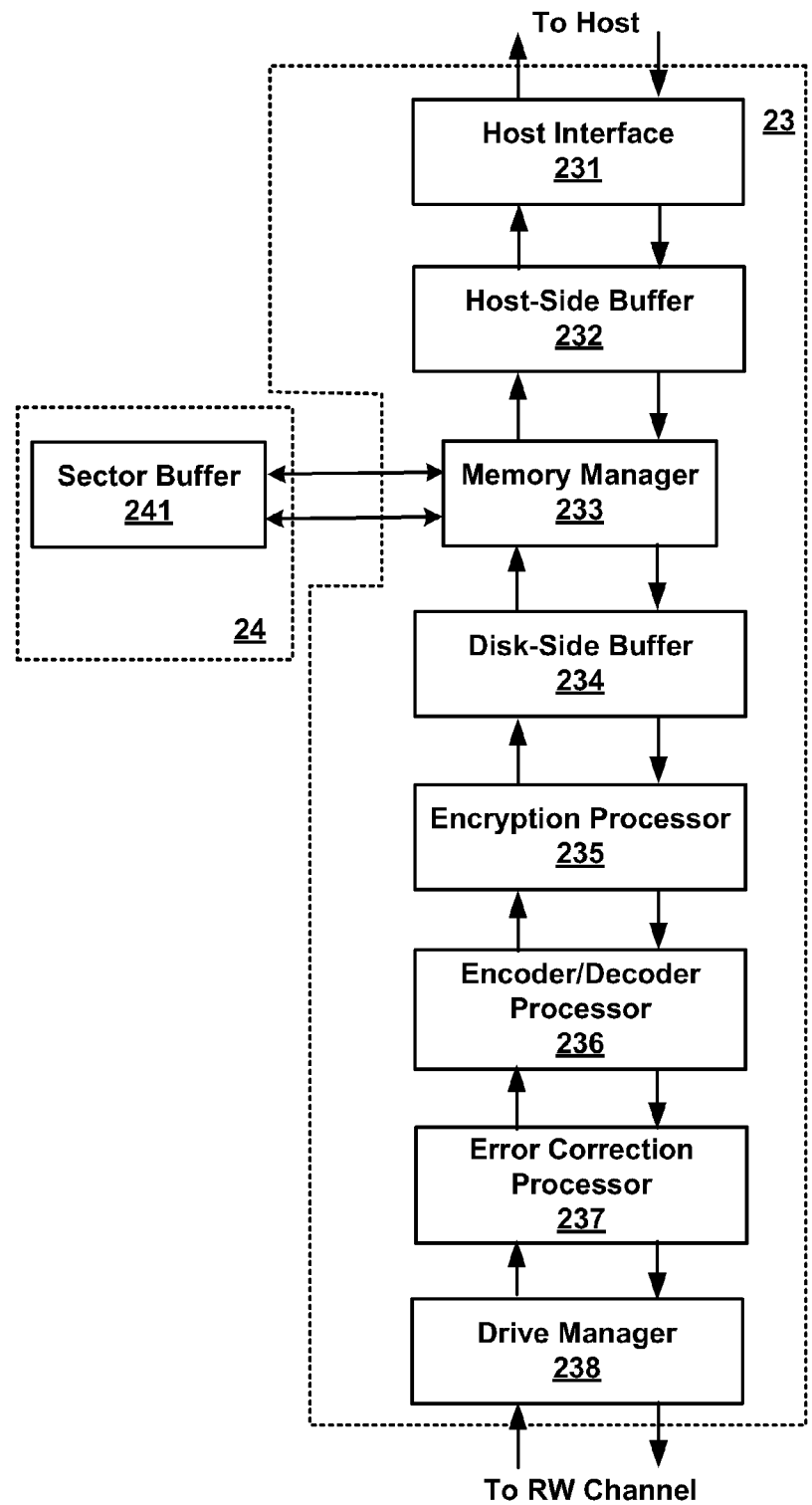
FIG. 2 is a block diagram schematically illustrating the main structural elements relating to the data conversion process in the read and write processes with the HDD in accordance with an embodiment of the present technology.

In this embodiment, HDC 23 executes the encryption process for user data stored in magnetic disk 11. FIG. 2 is a block diagram schematically illustrating the main structural elements of HDC 23 relating to the read and write processes for user data. HDC 23 is provided with host interface 231, host-side buffer 232, memory manager 233, disk-side buffer 234, encryption processor 235, encoder/decoder processor 236, error correction processor 237, and drive manager 238. These all comprise a logic circuit.

Host interface 231 is an interface which communicates data with external host 51. Memory manager 233 executes such functions as data flow control and access to the memory bus. Encryption processor 235 carries out encryption and decryption of user data. Encoder/decoder processor 236 carries out encoding and decoding of data to ensure that the bit sequence of the user data is suitable for recording in magnetic disk and 11. Error correction processor 237 carries out detection and correction of data errors in magnetic disk 11. Sector buffer 241 formed within RAM 24 temporarily stores write data and read data.

In the write process, host interface 231 receives user data from host 51. Memory manager 233 accepts user data via host-side buffer 232, and stores these in sector buffer 241. Sector 25 buffer 241 is a memory area within RAM 24. Memory manager 233 then transfers the user data extracted from sector buffer 241 to disk-side buffer 234.

Encryption processor 235 encrypts the user data received from disk-side buffer 234. Encryption processor 235 encrypts only the user data indicated by the encryption flag. There is no particular limitation on the encryption algorithm used by encryption processor 235. Moreover, there is no particular limitation on bit numbers and format for the encryption flag. Encryption processor 235 carries out encryption for each specific block. In this embodiment, it carries out encryption for each data sector. Encryption processor 235 skips encryption for user data where the encryption flag indicates non-encryption, and transfers user data as plain text (non-encrypted) to encoder/decoder processor 236.

Encoder/decoder processor 236 carries out an encoding process for writing data into magnetic disk 11. Encoder/decoder processor 236 carries out the encoding for each specific block. In the embodiment, it encodes for each data sector. In a typical structure, encoder/decoder processor 236 randomizes the data, and moreover carries out RLL encoding on this randomized data. RLL stands for Run-Length Limited. The characteristic of this embodiment is that encoder/decoder processor 236 does not carry out encoding of specified data containing the encryption flag, but transfers this specified data in plain text (unencoded) to error processor 237. This point will be explained later.

In the embodiment encryption processor 235 and encoder/decoder processor 236 are pipelined. Encoder/decoder processor 236 is able to carry out encoding in parallel on the same data sector as the data sector which encryption processor 235 is encrypting. Encoder/decoder processor 236 receives data encrypted by encryption processor 235 in the data sector, and carries out encoding of those parts received while encryption processor 235 is encrypting other parts. This point will be explained later.

In one embodiment, error correction processor 237 creates ECC codes from the received data, and transfers the received data and the ECC codes to drive manager 238. Error correction processor 237 generates an ECC code for each specific block. In the embodiment, it generates an ECC code for each data sector. Drive manager 238 transfers data received from error correction processor 237 to RW channel 21.

In one embodiment, in the read process, an error correction process is carried out on data received from RW channel 21 via drive manager 238 from error correction processor 237. Error correction is typically done by data sector. Error-corrected data is transferred to encoder/decoder processor 236, and decoded. The decoding process is also typically done by data sector. There is no need to decode data that has not been encoded, as described above.

In one embodiment, as described above, encoding/decoder processor 236 and encryption processor 235 are pipelined. Encryption processor 235 receives the portions decoded by encoder/decoder processor 236 in the data sector, and decrypts them. In the write process, data that has not been encrypted is transferred to disk-side buffer 234 without decryption.

After temporarily storing data received from disk-side buffer 234 in sector buffer 241, memory manager 233 extracts this and outputs it to host-side buffer 232. Host interface 231 transfers data received from host-side buffer 232 to host 51.

Figure 3:
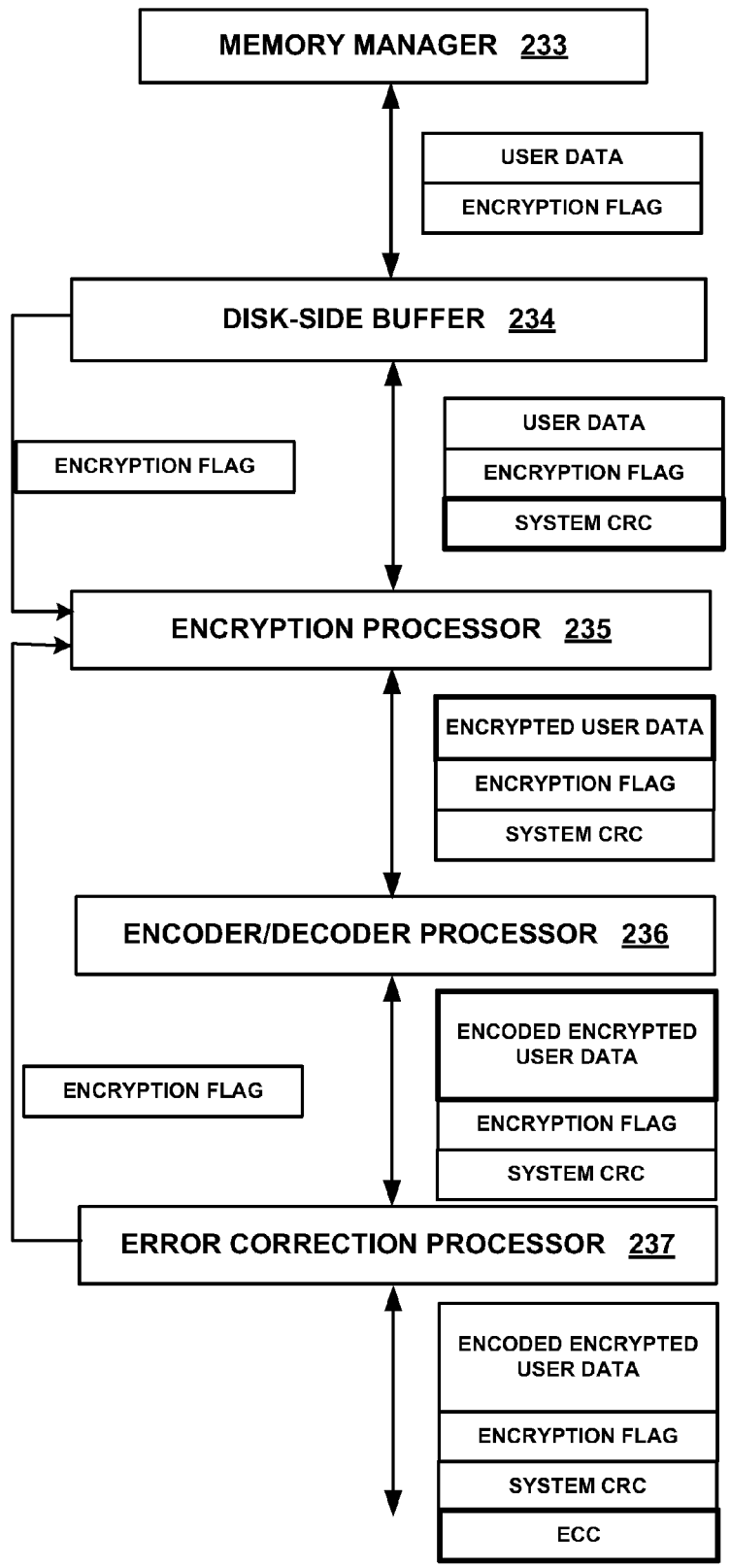
FIG. 3 is a block diagram schematically illustrating the conversion of data in the data conversion process in the read process and write process with the HDD in accordance with an embodiment of the present technology.

In the write and read processes described above, the embodiment has the characteristic of a data conversion process. In what follows, a specific description will be given of the data processing for the above structural elements. FIG. 3 is a block diagram schematically illustrating the data processing and data changes for each of the structural elements from memory manager 233 to error correction processor 237. In these blocks, the write process and the read process are reverse processes, and the format of data transferred between the blocks is the same for the read process and the write process.

In the write process, memory manager 233 transfers the user data and encryption flag to disk-side buffer 234. The encryption flag is attached to the end of the user data. Disk-side buffer 234 generates a CRC code from the user data received. As the CRC code is attached before encryption of the user data, it is possible to protect the encrypted user data from errors. Depending on the design, an ECC code may be attached instead of a CRC code as the error check code.

Disk-side buffer 234 transfers the encryption flag to encryption processor 235 before transferring the user data. Encryption processor 235 determines whether or not the received user data should be encrypted by referring to the encryption flag. FIG. 3 shows an example of encryption processing of the user data by encryption processor 235. Where the encryption flag indicates that encryption is not to be done, the user data is transferred to encoder/decoder processor 236 as plain text.

Where the encryption flag indicates encryption, encryption processor 235 encrypts the user data. The encryption flag and CRC code are not encrypted. As described above, encryption processor 235 and encoder/decoder processor 236 are capable of pipeline processing. Encryption processor 235 transfers from encrypted portions within the data sector to encoder/decoder processor 236. Encoder/decoder processor 236 commences encoding of the received portions before encryption processor 235 has completed encryption of the data sector.

In one embodiment, encoder/decoder processor 236 encodes the user data, but does not encode the encryption flag. To simplify the process, the CRC code will, in one embodiment, be in the bit string behind the encryption flag. In one embodiment, the CRC code is not encoded in this data sequence as well. By this means, it is possible to keep the process simple. Depending on the design, the CRC code may also be encoded. Encoder/decoder processor 236 either encodes all of the user data, or may encode only a part. In the example shown in FIG. 3, all of the user data is encoded.

Error correction processor 237 receives the encryption flag and the CRC code and generates an ECC code from these. The ECC code protects all of the above data from errors. Error correction processor 237 transfers all the data comprising the user data, encryption flag, CRC code, and ECC codes to the RW channel 21.

Figure 4:
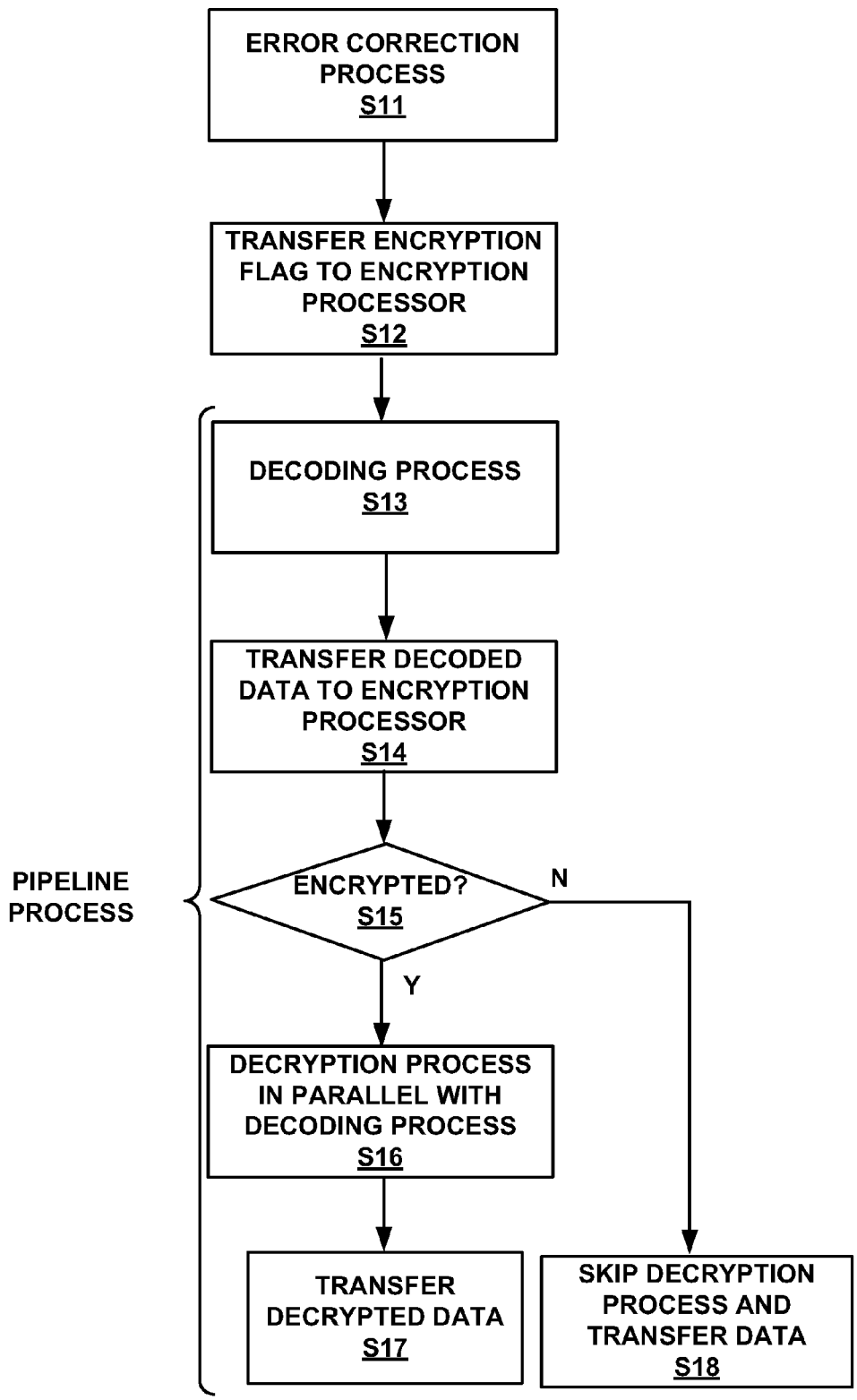
FIG. 4 is a flowchart illustrating the flow of data processed in the HDD in the read process in accordance with an embodiment of the present technology.

The read process will now be described with reference to the flowchart in FIG. 4 as well as the block diagram in FIG. 3. In the read process, error correction processor 237 uses the ECC code to carry out error correction where necessary (S 11). Error correction processor 237 transfers the received encryption flag to encryption processor 235 after carrying out the error correction process (S 12). Encoder/decoder processor 236 decodes the encoded data (S 13). In the example in FIG. 3, encoder/decoder processor 236 decodes all the encoded user data, and transfers it to encryption processor 235 (S 14).

In one embodiment, encryption processor 235 determines whether or not to encrypt the read data that will be transferred by referring to the received encryption flag (S 15). The decoding process and the decryption process in encryption processor 235 is a pipeline process. Where the user data is not encrypted (N in S 15), encryption processor 235 transfers the data transferred from encoder/decoder processor 236 as is to disk-side buffer 234 without decrypting it (S 18).

Where the encryption flag indicates encrypted user data (Y in S 15), encryption processor 235 sequentially decrypts the encrypted data transferred from encoder/decoder processor 236. The decoding and decryption is a pipeline process. Encryption processor 235 carries out the decryption of data in parallel with the decoding carried out by encoder/decoder processor 236 (S 16). Encryption processor 235 transfers the decrypted data sequentially to disk-side buffer 234 (S 17). As the encryption flag and CRC are not encrypted, they are transferred to disk-side buffer 234 without being decrypted.

In one embodiment, disk-side buffer 234 carries out an error check using the CRC codes. Where the CRC code indicates that there is an error, HDC 23 once again reads out from the identical data sector of magnetic disk 11. Where a repeat error is detected, HDC 23 carries out a process to deal with this error. As this error correction process is a well-known technique, its description will be omitted.

As will be clear from the above description, the encryption flag is stored in magnetic disk 11 without being encoded. As a result, encryption processor 235 is able to know whether or not the user data is encrypted without waiting for the decoding process of encoder/decoder processor 236. As a result, it is possible to have the decoding process and decryption process carried out in a pipeline, and encryption processor 235 is able to commence decryption of encrypted data transferred without waiting for the decoding process of encoder/decoder processor 236 to be completed. By this means, it is possible to shorten the processing time required for the read process and improve performance.

Furthermore, in one embodiment, as the decoding process and decryption process are carried out simultaneously, there is no need for data decoded by encoder/decoder processor 236 to be held in a memory (SRAM) before encryption processor 235 commences the decryption process. By this means, it is possible to reduce the circuit size for HDC 23.

As described above, a CRC code is attached prior to encryption. As a result, it is possible to protect user data from any errors occurring both from when user data is encrypted to when the ECC code is attached to the encrypted data, and until the encoded data which has been error-corrected by the ECC code is decrypted.

Figure 5:
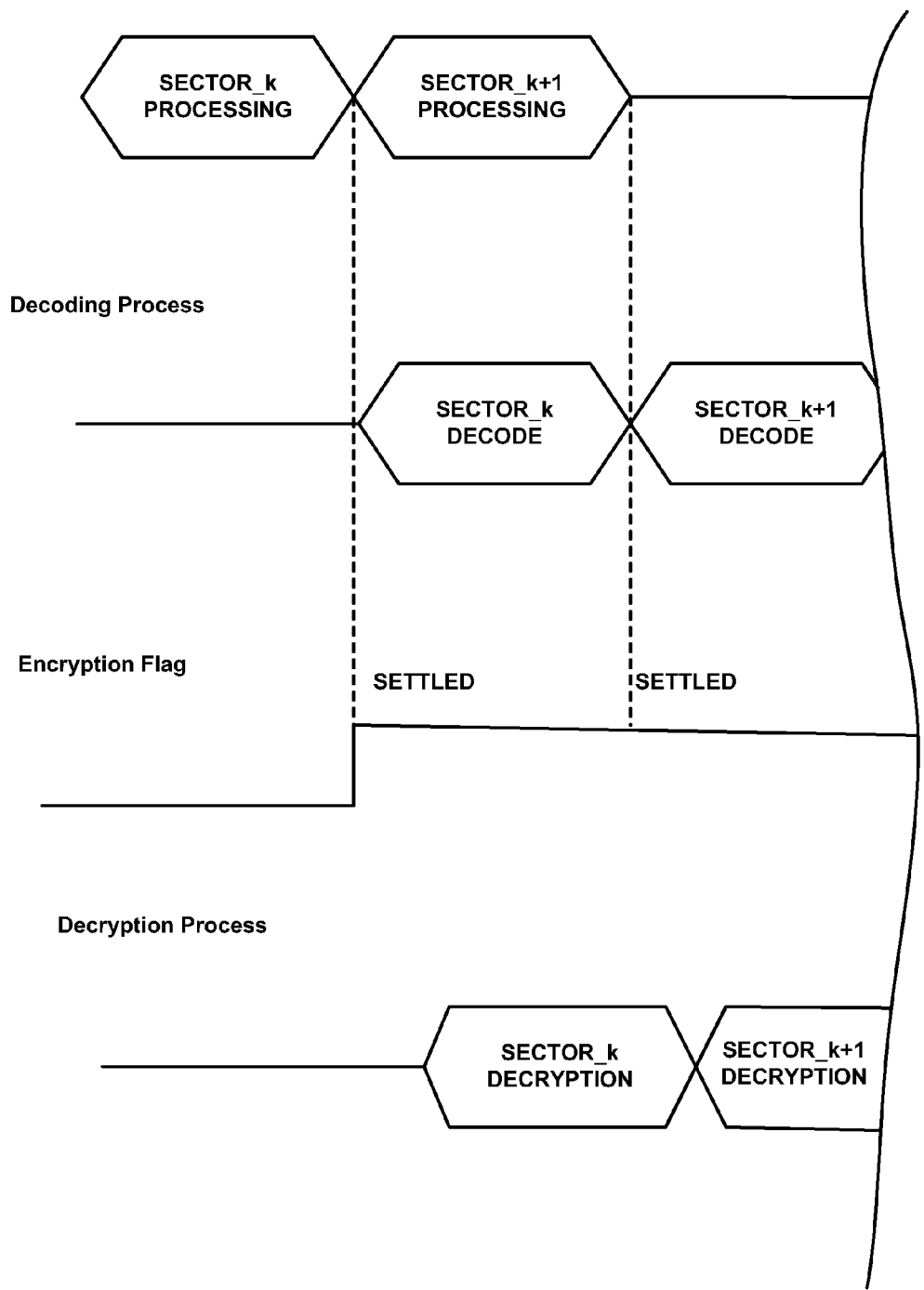
FIG. 5 is a block diagram showing the pipeline process for the encryption processor and encoder/decoder processor in accordance with embodiments of the present technology.

A description will now be given with reference to FIG. 5 of the pipeline process involving encryption processor 235 and encoding/decoding processor 236. FIG. 5 is a timing chart for the decoding and decrypting processes in the read process. When carrying out error correction for data sector k, error correction processor 237 sets the encryption flag when the error correction process is complete. Moreover, error correction processor 237 starts transferring to encoder/decoder processor 236 when the error correction process is complete. When data sector k transfer begins, the transfer of the encryption flag to encryption processor 235 takes place simultaneously.

In one embodiment, encoder/decoder processor 236 commences decoding of data sector k and transfers the decoded data to encryption processor 235. Encryption processor 235 obtains the encryption flag when the lead data of the decoded data sector k is transferred to encryption processor 235. Encryption processor 235 determines whether or not to decrypt the transferred data sector k with reference to the encryption flag.

In the example in FIG. 5, encryption processor 235 decrypts the transferred data sector k and data sector k+1. The decoding and decryption of data sector k is carried out in parallel. Moreover, error correction processor 237 executes the error correction process for the next data sector k+1 while this is happening.

In one embodiment, encoder/decoder processor 236 encodes the user data to reduce the error rate in reading from magnetic disk 11. RLL encoding is a typical method of encoding. As is widely known, RLL encoding is a method of encoding data which ensures that the continuous number of 0 or 1 bits is less than a stipulated number. As RLL encoding is a well-known technique its detailed description will be omitted.

As described above, in this embodiment encoder/decoder processor 236 transfers the encryption flag to the block on the disk side without encoding. Moreover, to simplify the process, the CRC code attached in the data processing after attachment of the encryption flag is attached to a bit string subsequent to the encryption flag, and is not subject to RLL encoding. In one embodiment, this data should also conform as far as possible to the RLL encoding rules so that they can be written into magnetic disk 11, and may follow the RLL encoding rules.

Moreover, error correction processor 237, in one embodiment, generates an ECC code after the encoding process carried out by encoder/decoder processor 236. The ECC code is also not encoded by encoder/decoder processor 236. In the same way as for the encryption flag and the CRC code, it is possible that the ECC code should also conform as far as possible to the RLL encoding rules so that it can be written into magnetic disk 11, and may follow the RLL encoding rules.

In this embodiment, HDC 23 divides the data that is not RLL-encoded into a plurality of blocks, and by inserting these separately within the RLL-encoded data, is able to reduce the error rate. In an example structure, the data length of the divided blocks, and the data length of the RLL-encoded data between the blocks inserted into the RLL-encoded data, is set to satisfy the RLL encoding rules.

A description will now be given as an example structure of an example of RLL non-encoded data containing the encryption flag, CRC code and the ECC code being divided into a plurality of blocks and inserted into the RLL-encoded data. In one embodiment, all the non-RLL-encoded data are divided into blocks in this way, but the effect of reducing the error rate will be evident even where this is only done for a part of it.

Figure 6:
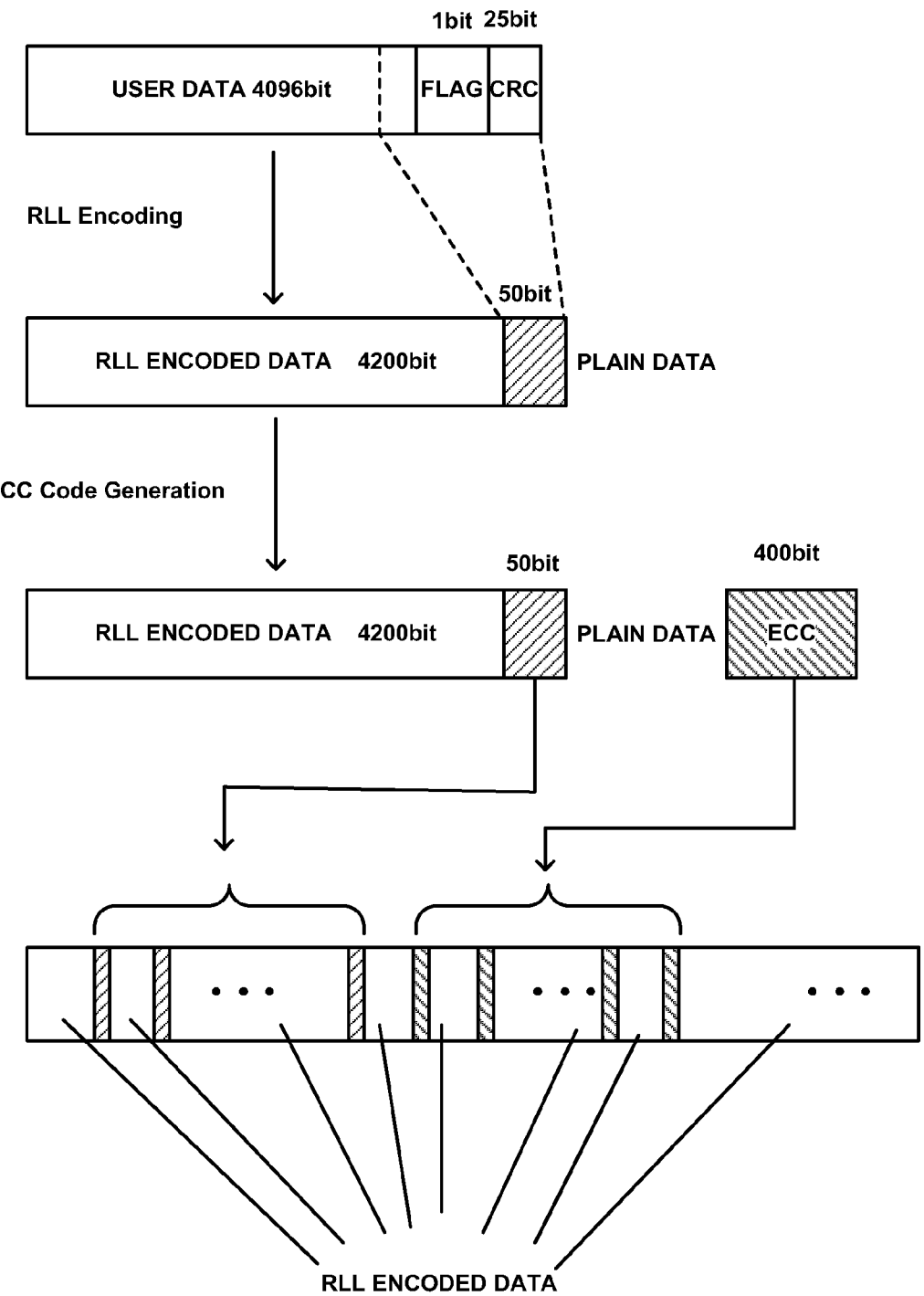
FIG. 6 is a block diagram schematically illustrating the method of inserting non-RLL-encoded data block into RLL-encoded data in accordance with an embodiment of the present technology.

FIG. 6 is a diagram schematically illustrating the method of inserting non-encoded RLL data blocks into the RLL-encoded data. In this example, before RLL encoding the frame comprises 4096 bits of user data, a one-bit encryption flag following this, and a 25-bit CRC code after this. Encoder/decoder processor 236 applies RLL-encoding 4072 bits of the 4096 bits of user data. 24 bits of user data, one bit encryption flag and 25 bit CRC code are in plain text and not RLL-encoded.

In one embodiment, from the point of view of RLL encoding and circuit structure, where it is possible to add separate data to data other than the user data, it is possible to add this data with part of the user data not RLL-encoded. By this means, it is not only possible to flexibly respond to the method of RLL encoding (including the circuit structure), but also to avoid a reduction in data capacity.

In one embodiment, error correction processor 237 generates a 400 bit ECC code from the 4200 bit RLL encoding data and the 50 bit plain text. Error correction processor 237 is provided with an SRAM which is a volatile memory, and stores this data in the SRAM. Thereafter, error correction processor 237 inserts a plurality of 50 bit plain text blocks and a plurality of 400 bit ECC code blocks into the 4200 bits of RLL-encoded data.

For example, error correction processor 237 divides the 50 bit plain text (encryption flag, CRC code, and part of the user data) and generates five 10-bit blocks, inserting these into positions separated by RLL-encoded data. In the same way, the 400 bit ECC code is divided up to generate 40 10-bit blocks, and these are inserted into positions separated by RLL-encoded data.

As described above, the blocks will have block lengths and block intervals which satisfy the RLL encoding rules. From the point of view of simplifying the process, the block lengths are identical, and it is possible that the distances between the inserted blocks are constant.

Error correction processor 237 inserts the plurality of blocks into the RLL-encoded data by selecting addresses for the data read out from the SRAM. For example, the SRAM within error correction processor 237 stores RLL-encoded data, 50-bit plain text and ECC codes in the order of their addresses. Error correction processor 237 transfers data to drive manager 238 while generating data shown at the bottom of FIG. 6 by controlling the sequence with which data is read out from SRAM.

In one embodiment, ECC codes are generated from RLL-encoded data and 50 bit plain text, and are typically attached after these. Thus from the point of view of simplicity of processing, it is possible to insert the ECC code blocks after inserting the 50 bit plain text blocks, as shown at the bottom of FIG. 6. In the example shown in FIG. 6, all of the blocks have the same block lengths and the intervals between blocks are also fixed.

In the read process, error correction processor 237 obtains the data format shown at the bottom of FIG. 6 from drive manager 238. When storing the transferred data in the SRAM, the data format shown in the third level can be obtained by controlling the addresses stored in the SRAM. Error correction processor 237 is able to store addresses linking the continuous RLL-encoded data and the following 50 bit plain text as it extracts the divided blocks. The ECC code blocks are then extracted and stored in consecutive addresses within the RAM. Error correction processor 237 transfers the encryption flag to encryption processor 235 after performing error correction using the ECC code.

Thus with a structure in which the ECC codes are divided into blocks and inserted into the RLL encoding data in addition to the encryption flags and CRC codes, error correction processor 237 functions as an insertion processor, and is effective in dividing and inserting all the data. However, encoder/decoder processor 236 can function as an insertion processor and carry out this process in a structure where only the encryption flag and CRC data are divided and inserted.

Figure 7:
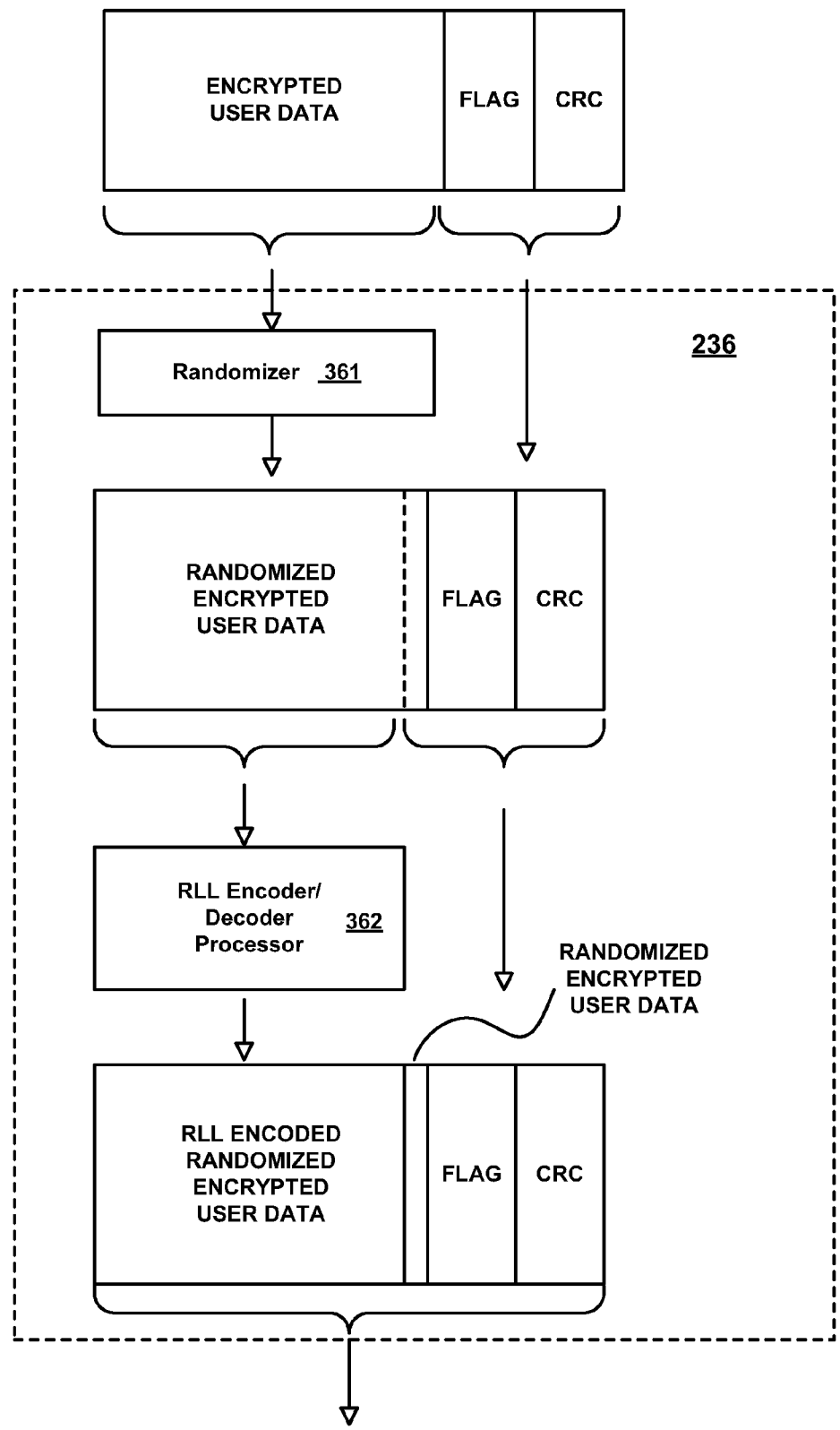
FIG. 7 is a block diagram schematically illustrating the encoding process within the encoding/decoding processor with a randomizer, in addition to the RLL encoder/decoder processor in accordance with an embodiment of the present technology.

In one embodiment, Encoder/decoder processor 236 will carry out randomization as well as RLL encoding. FIG. 7 is a block diagram schematically illustrating the encoding process within encoder/decoder processor 236 having randomizer 361 in addition to RLL encoder/decoder processor 362. FIG. 7 schematically illustrates the encoding process of encoder/decoder 236. The decoding process is the reverse of the process shown in FIG. 7.

In one embodiment, Encoder/decoder processor 236 carries out the randomizing process before the RLL encoding. Randomizer 361 randomizes all the user data. As the encryption flag needs to be set before the randomizing, randomizer 361 does not randomize the encryption flag. Moreover, the CRC code follows the encryption flag, and in the same way for the simplicity of the process randomizer 361 does not randomize the CRC code.

As described above, with only the encryption flag and CRC code, when there are insufficient bits to generate blocks for insertion within the RLL-encoded data, it is possible to use part of the user data. Part of the user data is used in block generation in FIG. 7 as well. RLL encoder/decoder processor 362 carries out RLL encoding on another part of the user data, with the part of the user data used in block generation, the encryption flag, and the CRC code being exempt from this process and not subject to RLL encoding.

An example of an embodiment of the invention has been described in the above, but the invention is not limited to this embodiment. Persons skilled in the art will be able to conceive of variations, additions and alterations to the various elements of the embodiment within the spirit of the invention. For example, the invention can be applied to disk drives which use a different disk in place of a magnetic disk. Alternatively, it can be applied to a disk drive which only plays back data.

In the above example structure, the HDC carried out the process of encryption and encoding/decoding. Within the HDD, the above processes may be carried out in any of the circuit blocks. For example, where the RW channel has blocks with identical functions, it is possible to apply the invention to the processes in these functional blocks. The present technology is particularly useful in a disk drive which carries out encoding/decoding processes including RLL encoding/decoding, but may be applied to disks drives which carry out different encoding/decoding processes. Moreover, although it is common to use randomizing, randomizing is not required to practice the present technology.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the present technology be defined by the claims appended hereto and their equivalents.

What is claimed is:

1. A disk drive for encrypting user data, comprising:
   a motor configured to rotate a disk which stores encoded user data and an encryption flag which has not been encoded;
   an encoder/decoder processor configured to encode said user data that is written into said disk without encoding said encryption flag, and decodes said user data that is read out from said disk without decoding said encryption flag that is read out from said disk; and
   an encryption processor configured to encrypt said user data at said encryption flag, wherein said encryption flag indicates encryption before said encoder/decoder processor starts encoding, and wherein said encryption processor obtains an encryption flag read out from said disk before said encoder/decoder processor completes decoding of said user data read out from said disk, commencing decryption of decoded data where said encryption flag indicates encryption before decoding of said user data is complete.

2. The disk drive of claim 1, further comprising:
   an error checking code generator configured to generate and attach an error checking code to said user data before encryption of said user data by said encryption processor.

3. The disk drive of claim 1, further comprising:
   wherein said encoder/decoder processor is further configured to carry out RLL encoding on said user data; and
   an insertion processor which inserts an encryption flag into said user data encoded with RLL so as to satisfy RLL encoding rules.

4. The disk drive of claim 3, further comprising:
   an error checking code generator configured to generate and attach an error checking code to said user data before encryption of said user data by said encryption processor; and
   wherein said insertion processor is further configured to combine said encryption flag and at least part of said error checking code into a single block, which is inserted within said user data encoded with RLL.

5. The disk drive of claim 4, wherein said insertion processor divides data containing said encryption flag and said error checking code into a plurality of blocks of identical data length, which are inserted separately within said user data encoded with RLL.

6. The disk drive of claim 5, wherein said encoder/decoder processor skips RLL encoding of a part of said user data; and
   wherein said insertion processor divides data containing said encryption flag and said error checking code into a plurality of blocks of identical data length, which are inserted separately within said user data encoded with RLL.

7. The disk drive of claim 3, further comprising:
   an error correction processor which generates and attaches an ECC code for data containing said encryption flag and said user data encoded by said encoder/decoder processor, said error correction processor functioning as said insertion processor, dividing said ECC code into a plurality of blocks of identical data length, which are inserted separately within said user data encoded with RLL.

8. The disk drive of claim 7, wherein said error correction processor inserts said ECC codes after said encryption flag has been inserted in said user data encoded with RLL.

9. The disk drive of claim 7, wherein said error correction processor transfers said encryption flag to said encryption processor after error correction processing.

10. A method of processing data transformation in a disk of a disk drive which encrypts user data which comprises an encryption flag which indicates encryption, said method comprising:
  encoding said user data without encoding said encryption flag;
  storing said user data that has been encoded and said encryption flag that has not been encoded in said disk;
  decoding said user data that is read out from said disk,
  obtaining said encryption flag that is read out from said disk before said decoding of said user data is complete; and
  commencing decryption of said user data before said decoding of said user data is complete where said encryption flag indicates encryption.

11. The method of claim 10, further comprising:
  generating and attaching error correction code to said user data before said user data is encrypted.

12. The method of claim 10, further comprising:
  said encoding said user data further comprises RLL encoding on said user data carried out by an encoder/decoder processor; and
  inserting an encryption flag, by an insertion processor, within said user data encoded with RLL to satisfy RLL encoding rules.

13. The method of claim 12, further comprising:
  generating and attaching error correction code to said user data before said user data is encrypted; and
  combining said encryption flag and at least a part of said error correction code into a single block, which is inserted within said user data encoded with RLL.

14. The method of claim 13, wherein data containing said encryption flag and said error correction code are divided into a plurality of blocks of identical data length, which are inserted separately within said user data encoded with RLL.

15. The method of claim 14, further comprising:
  skipping said RLL encoding of a part of said user data.

16. The method of claim 12, further comprising:
  generating and attaching ECC code for data comprising said encryption flag and said user data encoded by an encoder/decoder processor;
  dividing said ECC codes into a plurality of blocks of identical data length, which are inserted separately within said user data encoded with RLL.

17. The method of claim 16, wherein said ECC codes are inserted after said encryption flag is inserted into said user data encoded with RLL.

18. The method of claim 16, further comprising:
  transferring said encryption flag to an encryption processor after an error correction process.

* * * * *